United States Patent
Chang et al.

(10) Patent No.: US 9,560,677 B2
(45) Date of Patent: Jan. 31, 2017

(54) COMMUNICATION CONTROL METHOD, BASE STATION, AND USER TERMINAL

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 162 days.

(21) Appl. No.: 14/373,489

(22) PCT Filed: Jan. 25, 2013

(86) PCT No.: PCT/JP2013/051668
§ 371 (c)(1),
(2) Date: Jul. 21, 2014

(87) PCT Pub. No.: WO2013/111888
PCT Pub. Date: Aug. 1, 2013

(65) Prior Publication Data
US 2014/0362757 A1 Dec. 11, 2014

Related U.S. Application Data

(60) Provisional application No. 61/591,479, filed on Jan. 27, 2012.

(51) Int. Cl.
*H04W 76/00* (2009.01)
*H04W 36/04* (2009.01)
(Continued)

(52) U.S. Cl.
CPC ....... *H04W 76/002* (2013.01); *H04W 36/0083* (2013.01); *H04W 36/04* (2013.01); *H04W 16/32* (2013.01); *H04W 84/045* (2013.01)

(58) Field of Classification Search
CPC .. H04W 16/32; H04W 36/04; H04W 36/0083; H04W 76/002; H04W 84/045
(Continued)

(56) References Cited

U.S. PATENT DOCUMENTS

2010/0330994 A1 12/2010 Matsuo et al.
2011/0216732 A1* 9/2011 Maeda .................... H04W 4/08
370/329
(Continued)

FOREIGN PATENT DOCUMENTS

JP 2009-207108 A 9/2009
JP 2011-234039 A 11/2011

OTHER PUBLICATIONS

International Search Report; PCT/JP2013/051668; Feb. 26, 2013.
(Continued)

*Primary Examiner* — Luat Phung
*Assistant Examiner* — Saad A Waqas
(74) *Attorney, Agent, or Firm* — Studebaker & Brackett PC

(57) ABSTRACT

A user terminal employed in a mobile communication system including a general cell supporting PTM distribution of MBMS data and a specific cell not supporting PTM distribution of the MBMS data, the user terminal receives a connection establishment message for establishing a connection between the user terminal and the general cell from the general cell when the user terminal is in an idle mode with the general cell selected as a serving cell. The user terminal sends an establishment completion message indicating completion of establishment of the connection in response to the connection establishment message received from the general cell. The user terminal sends the general cell a proximity notification that the specific cell exists near
(Continued)

the user terminal if the specific cell exists, together with the establishment completion message.

5 Claims, 7 Drawing Sheets

(51) Int. Cl.
*H04W 36/00* (2009.01)
*H04W 16/32* (2009.01)
*H04W 84/04* (2009.01)

(58) Field of Classification Search
USPC .......................................................... 370/312
See application file for complete search history.

(56) References Cited

U.S. PATENT DOCUMENTS

| 2012/0182921 | A1* | 7/2012 | Tsuboi | .................. | H04W 4/021 |
| | | | | | 370/312 |
| 2012/0196603 | A1* | 8/2012 | Mochizuki | ............ | H04W 48/02 |
| | | | | | 455/436 |
| 2012/0236776 | A1* | 9/2012 | Zhang | ................... | H04W 48/12 |
| | | | | | 370/312 |
| 2013/0095838 | A1 | 4/2013 | Uemura et al. | | |
| 2013/0308527 | A1* | 11/2013 | Chin | ..................... | H04W 76/06 |
| | | | | | 370/328 |

OTHER PUBLICATIONS

Kyocera; "MBMS service continuity for inbound mobility to non-MBMS capable cells"; 3GPP TSG-RAN WG2 #75 R2-114095; Aug. 26, 2011.

Huawei; "Service continuity improvements for MBMS for LTE"; 3GPP TSG-RAN#51 RP-111374; Fukuoka, Japan; 13-16th, 2011.

\* cited by examiner

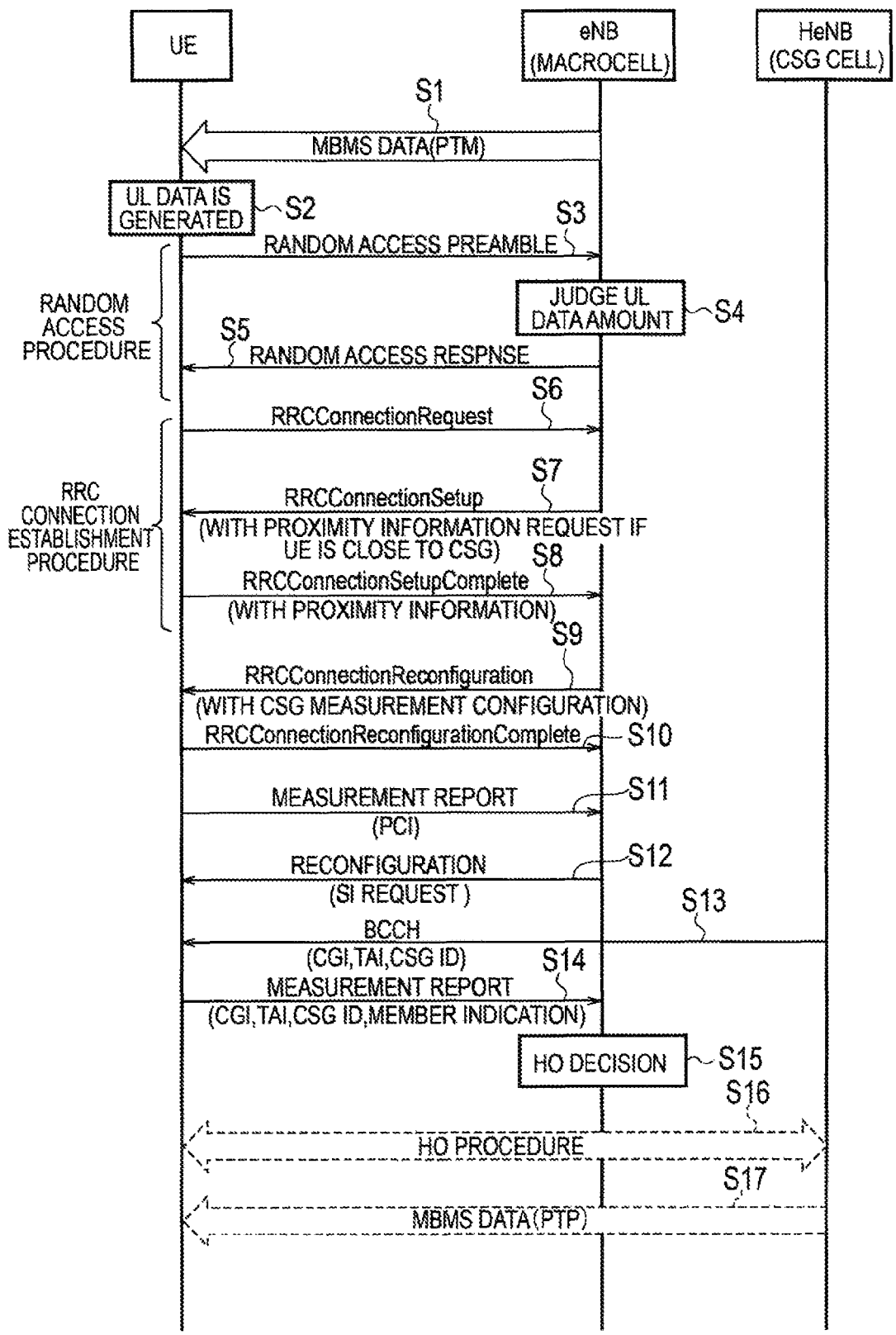

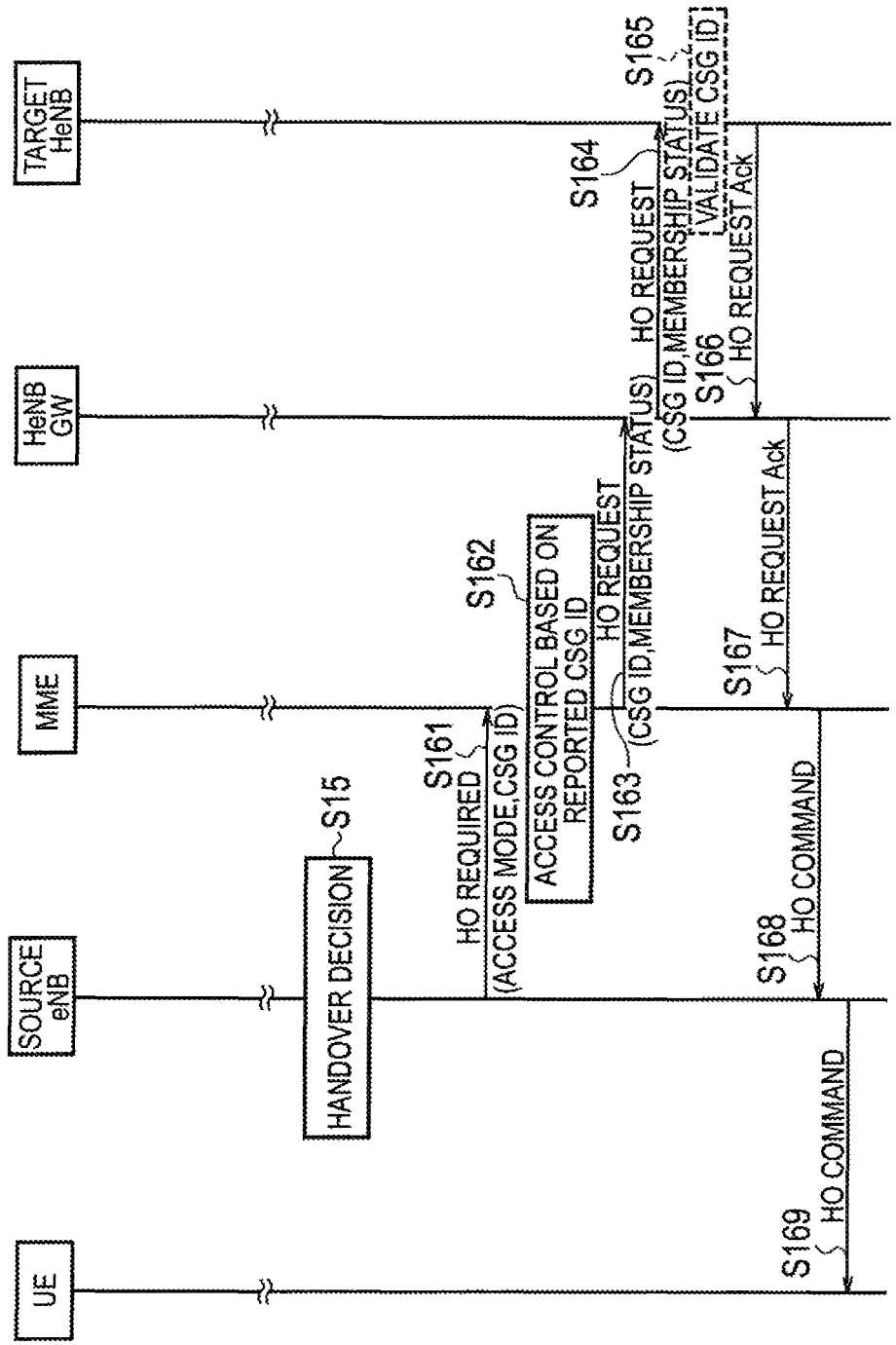

COMMUNICATION CONTROL METHOD, BASE STATION, AND USER TERMINAL

TECHNICAL FIELD

The present invention relates to a communication control method, a base station, and a user terminal, employed in a mobile communication system including a general cell supporting PTM distribution of MBMS data and a specific cell not supporting PTM distribution of MBMS data.

BACKGROUND ART

In 3GPP (3rd Generation Partnership Project) which is a standardization project of mobile communication systems, standardization of eMBMS (evolved Multimedia Broadcast Multicast Service) is in progress (see Non-patent Document 1, for example).

In such a mobile communication system, a general cell (such as a macrocell) supports MBMS and is capable of distributing MBMS data by multicast (Point-To-Multipoint: PTM).

In contrast, a specific cell (such as a CSG cell) not supporting MBMS is not capable of distributing MBMS data by PTM. Hence, studies are being made to distribute MBMS data by unicast (Point-To-Point: PTP) to a user terminal which establishes a connection with a specific cell.

Note that the term "cell" is used not only to indicate the smallest unit of a radio communication area, but also to indicate a function of performing radio communication with a user terminal.

PRIOR ART DOCUMENT

Non-Patent Document

[Non-patent Document 1] 3GPP Contribution RP-111374, September 2011

SUMMARY OF THE INVENTION

Assumed is a situation where, in a communication environment in which a general cell includes a specific cell operated at a frequency different from that of the general cell, a user terminal located at a point where the general cell overlaps the specific cell receives MBMS data distributed from the general cell by PTM in an idle mode.

When uplink data to be sent by the user terminal is generated in this situation, the user terminal usually establishes a connection with a general cell selected as a serving cell (Serving Cell).

However, in a case where the general cell has a high load level, for example, there is a problem that the user terminal receives low-quality service after establishing the connection with the general cell.

Therefore, the present invention aims to provide a communication control method, a base station, and a user terminal capable of avoiding low service quality.

A communication control method according to the present invention employed in a mobile communication system including a general cell (e.g. macrocell) supporting PTM distribution of MBMS data and a specific cell (e.g. CSG cell) not supporting PTM distribution of the MBMS data, the method comprises: a step A of sending the general cell a connection establishment request message (e.g. RRC connection request message) from a user terminal (UE) in an idle mode with the general cell selected as a serving cell, when the user terminal requests establishment of a connection (e.g. RRC connection) with the general cell; a step B of sending the user terminal a connection establishment message (e.g. RRC connection establishment message) for establishing the connection from the general cell, in response to the connection establishment request message received from the user terminal; and a step C of sending an establishment completion message (e.g. RRC connection establishment completion message) indicating completion of establishment of the connection from the user terminal, in response to the connection establishment message received from the general cell, wherein in the step B, the general cell sends the user terminal notification request information (e.g. Proximity information request) together with the connection establishment message, the notification request information is information for requesting transmission of a proximity notification (e.g. Proximity information) that the specific cell exists near the user terminal if the specific cell exists, and in the step C, the user terminal sends the general cell the proximity notification together with the establishment completion message if the specific cell exists near the user terminal.

The communication control method may further comprises: a step D of sending the user terminal a measurement instruction (e.g. CSG measurement configuration) instructing measurement of the specific cell from the general cell, upon receipt of the proximity notification from the user terminal; a step E of sending the general cell a measurement report for reporting a result of the measurement from the user terminal, after the user terminal measures the specific cell according to the measurement instruction received from the general cell; and a step F of determining whether or not to make the user terminal perform handover from the general cell to the specific cell, by a general base station (e.g. eNB) managing the general cell, based on the measurement report received from the user terminal.

The communication control method may further comprises, before the step A, a step of performing a random access procedure for the general cell by the user terminal, wherein in the step F, the general base station may determine whether or not to make the user terminal perform handover from the general cell to the specific cell, based not only on the measurement report received from the user terminal, but also on an uplink data amount of the user terminal estimated in the random access procedure.

In the communication control method, the specific cell may be a CSG cell operated at a frequency different from a frequency of the general cell.

A base station according to the present invention managing a general cell supporting PTM distribution of MBMS data in a mobile communication system including the general cell and a specific cell not supporting PTM distribution of the MBMS data, the base station comprises: a receiver (e.g. radio transceiver 110 and controller 140) that receives a connection establishment request message from a user terminal in an idle mode with the general cell selected as a serving cell, when the user terminal requests establishment of a connection with the general cell; and a transmitter (e.g. radio transceiver 110 and controller 140) that sends the user terminal a connection establishment message for establishing the connection in response to the connection establishment request message received from the user terminal, wherein the transmitter sends the user terminal notification request information together with the connection establishment message, and the notification request information is information for requesting transmission of a proximity notification that the specific cell exists near the user terminal if the specific cell exists.

A user terminal according to the present invention employed in a mobile communication system including a general cell supporting PTM distribution of MBMS data and a specific cell not supporting PTM distribution of the MBMS data, the user terminal comprises: a receiver (e.g. radio transceiver 210 and controller 240) that receives a connection establishment message for establishing a connection between the user terminal and the general cell from the general cell when the user terminal is in an idle mode with the general cell selected as a serving cell; and a transmitter (e.g. radio transceiver 210 and controller 240) that sends an establishment completion message indicating completion of establishment of the connection in response to the connection establishment message received from the general cell, wherein the transmitter sends the general cell a proximity notification that the specific cell exists near the user terminal if the specific cell exists, together with the establishment completion message.

BRIEF DESCRIPTION OF THE DRAWINGS

FIG. 9 is a sequence chart showing operations of the eNB and the UE according to the embodiment of the present invention.

FIG. 10 is a sequence chart showing a concrete example of a handover procedure according to the embodiment of the present invention.

MODES FOR CARRYING OUT THE INVENTION

Summary of the Embodiment

A communication control method employed in a mobile communication system including a general cell (e.g. macrocell) supporting PTM distribution of MBMS data and a specific cell (e.g. CSG cell) not supporting PTM distribution of the MBMS data, the method comprises: a step A of sending the general cell a connection establishment request message (e.g. RRC connection request message) from a user terminal (UE) in an idle mode with the general cell selected as a serving cell, when the user terminal requests establishment of a connection (e.g. RRC connection) with the general cell; a step B of sending the user terminal a connection establishment message (e.g. RRC connection setup message) for establishing the connection from the general cell, in response to the connection establishment request message received from the user terminal; and a step C of sending an establishment completion message (e.g. RRC connection establishment completion message) indicating completion of establishment of the connection from the user terminal, in response to the connection establishment message received from the general cell.

In the step B, the general cell sends the user terminal notification request information (e.g. Proximity information request) together with the connection establishment message. The notification request information is information for requesting transmission of a proximity notification (e.g. Proximity information) that the specific cell exists near the user terminal if the specific cell exists. In the step C, the user terminal sends the general cell the proximity notification together with the establishment completion message if the specific cell exists near the user terminal.

Thus, in the connection establishment procedure for establishing a connection between the user terminal and the general cell, the general cell can find whether or not the specific cell exists near the user terminal. Accordingly, when the specific cell exists near the user terminal and the general cell has a high load level, for example, the general cell can make the user terminal perform handover to the specific cell immediately after establishing the connection with the user terminal, for example. Consequently, it is possible to prevent the user terminal from receiving low-quality service.

Embodiment

In the embodiment, a description is given by taking as an example a mobile communication system configured in accordance with the 3GPP standard of release 10 or later (i.e., LTE Advanced).

Hereinafter, (1) outline of LTE system, (2) outline of MBMS, (3) configurations of eNB and UE, (4) operations of eNB and UE, and (5) summary of embodiment are described in this order.

(1) Outline of LTE System

Figure 1:
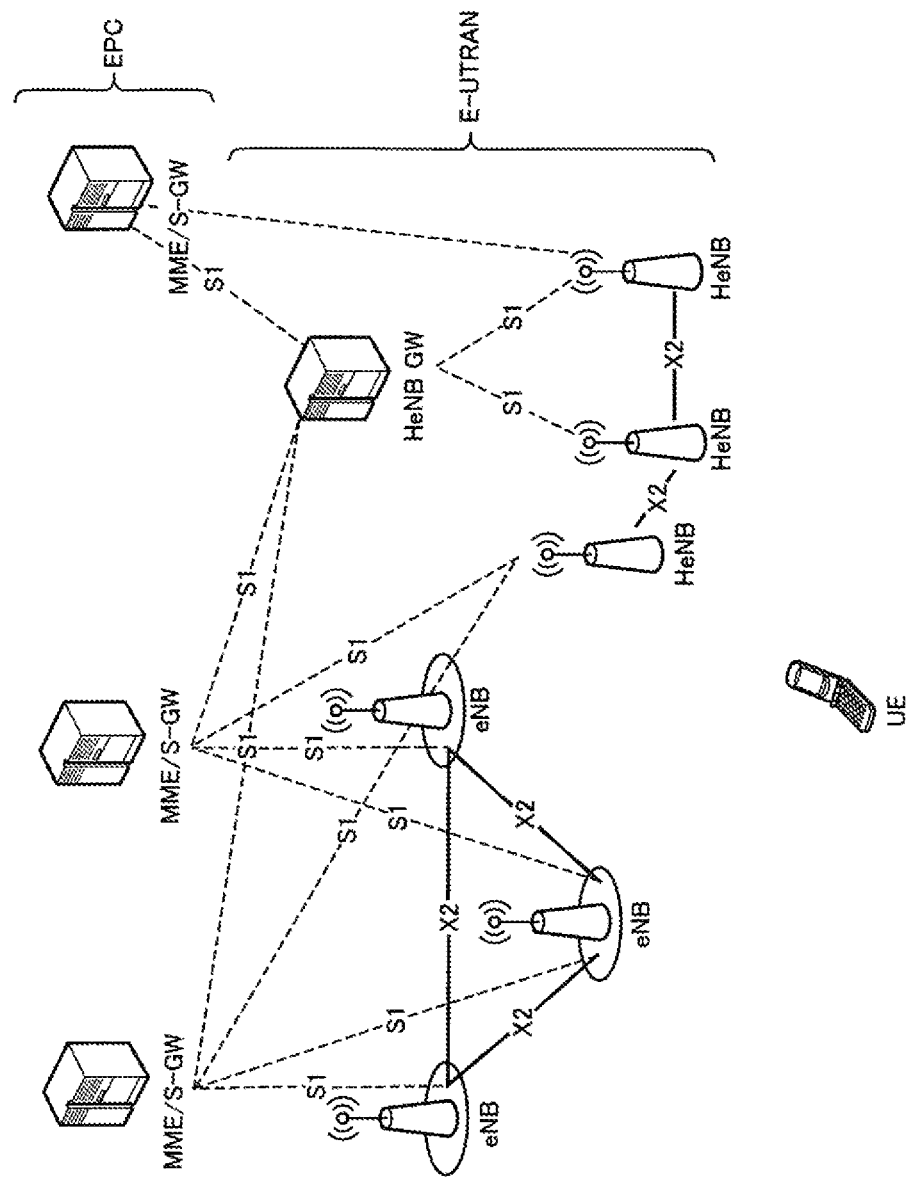
FIG. 1 shows a configuration of an LTE system according to an embodiment of the present invention.

FIG. 1 shows a configuration of an LTE system. As shown in FIG. 1, the LTE system is formed of an E-UTRAN (Evolved-UMTS Terrestrial Radio Access Network), a UE (User Equipment), and an EPC (Evolved Packet Core).

The E-UTRAN includes an eNB (evolved Node-B), an HeNB (Home evolved Node-B), and an HeNB GW (Home evolved Node-B Gateway).

The eNB manages a macrocell and performs radio communication with the UE which establishes a connection with the macrocell.

The macrocell supports MBMS. To be specific, the macrocell is capable of distributing MBMS data by PTM (multicast). In the embodiment, the macrocell corresponds to a general cell, and the eNB corresponds to a general base station.

The HeNB is a cell of a smaller coverage than the macrocell, and manages a CSG (Closed Subscriber Group) cell to which only a UE having access right can access. The HeNB performs radio communication with the UE which establishes a connection with the CSG cell.

The CSG cell does not support MBMS. To be specific, the CSG cell is not capable of distributing MBMS data by PTM. Note, however, that the CSG cell is capable of distributing MBMS data by PTP (unicast). In the embodiment, the CSG cell corresponds to a specific cell, and the HeNB corresponds to a specific base station.

In addition, the eNB and the HeNB have a radio resource management (RRM) function, a user data routing function, and a measurement control function for mobility control and scheduling, for example.

The HeNB GW has multiple HeNBs connected thereto, and manages the multiple HeNBs.

The EPC includes MME (Mobile Management Entity) and S-GW (Serving-Gateway). The MME is a network entity for performing various mobility control for the UE, and corresponds to a control station. The S-GW is a network entity for controlling transfer of user data, and corresponds to an exchange.

The eNBs (the HeNBs) are mutually connected over an X2 interface. The eNB (the HeNB) is connected with the MME and the S-GW (HeNB GW) over an S1 interface. The X2 interface and the S1 interface form a network interface.

The UE is a mobile radio communication device, and performs radio communication with a cell (serving cell) with which it establishes a connection. In the embodiment, the UE corresponds to a user terminal.

The UE in an idle mode (RRC idle mode) which is a standby mode selects a serving cell, and camps on the selected cell. Processing of changing the serving cell in the RRC idle mode is referred to as cell reselection.

The UE in a connected mode (RRC connected mode) which is a communicating state performs radio communication with the serving cell. Processing of changing the serving cell in the RRC connected mode is referred to as handover.

The UE supports MBMS. Specifically, the UE in the RRC idle mode or in the RRC connected mode can receive MBMS data distributed from the eNB by PTM.

Figure 2:
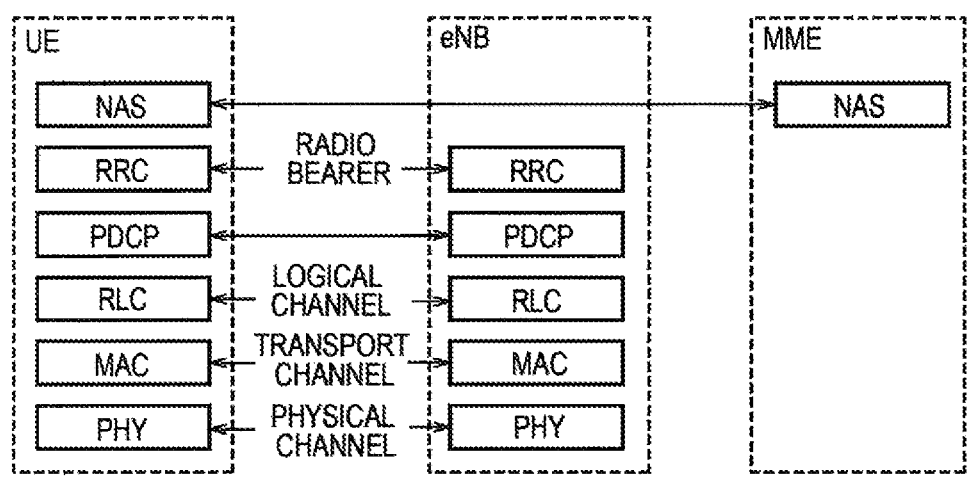
FIG. 2 shows a protocol stack of a radio interface of the LTE system according to the embodiment of the present invention.

FIG. 2 shows a protocol stack of a radio interface of the LTE system.

As shown in FIG. 2, radio interface protocols are classified into layer 1 to layer 3 of the OSI reference model, where layer 1 is the physical (PHY) layer. Layer 2 includes the MAC (Media Access Control) layer, the RLC (Radio Link Control) layer, and the PDCP (Packet Data Convergence Protocol) layer. Layer 3 includes the RRC (Radio Resource Control) layer.

The physical layer performs data coding/decoding, modulation/demodulation, antenna mapping/demapping, and resource mapping/demapping. The physical layer provides a transmission service to the upper layer through a physical channel. Data is transmitted through a physical channel between the physical layer of the UE and the physical layer of the eNB. The physical layer is connected to the MAC layer via a transport channel.

The MAC layer performs priority control of data, retransmission processing by hybrid ARQ (HARQ), and the like. Data is transmitted through a transport channel between the MAC layer of the UE and the MAC layer of the eNB. The MAC layer of the eNB includes a MAC scheduler configured to determine a transport format and resource blocks to be used in the uplink and the downlink. A transport format includes a transport block size, a modulation and coding scheme (MCS), and antenna mapping.

The RLC layer uses the functions of the MAC layer and the physical layer to transmit data to the RLC layer on the reception side. Data is transmitted through a logical channel between the RLC layer of the UE and the RLC layer of the eNB.

The PDCP layer performs header compression/expansion and encryption/decoding.

The RRC layer is defined only in a control plane. Data is transmitted through a radio bearer between the RRC layer of the UE and the RRC layer of the eNB. The RRC layer controls a logical channel, a transport channel, and a physical channel according to establishment, reestablishment and release of the radio bearer. When an RRC connection is established between the RRC of the UE and the RRC of the eNB, the UE is in an RRC connected mode, and if not, the UE is in an RRC idle mode.

A NAS (Non-Access Stratum) layer positioned higher than the RRC layer performs session management, mobility management and the like.

Figure 3:
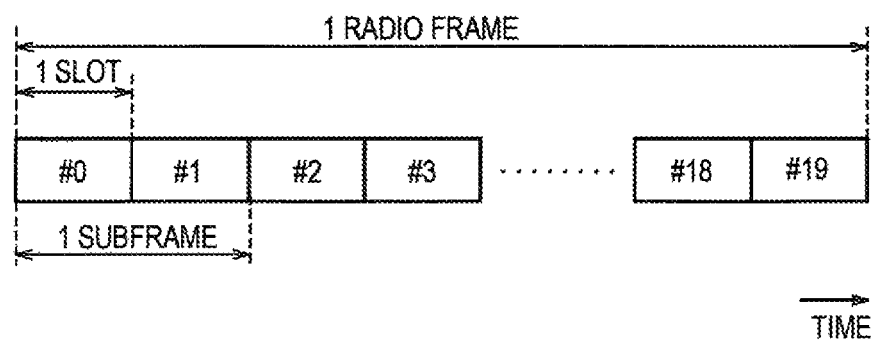
FIG. 3 shows a configuration of a radio frame used in the LTE system according to the embodiment of the present invention.

FIG. 3 shows a configuration of a radio frame used in the LTE system. The LTE system employs OFDMA (Orthogonal Frequency Division Multiplexing Access) in the downlink, and SC-FDMA (Single Carrier Frequency Division Multiple Access) in the uplink.

As shown in FIG. 3, a radio frame is formed of ten subframes aligned in the time direction, and each subframe is formed of two slots arranged side by side in the time direction. Each subframe is 1 ms in length, and each slot is 0.5 ms in length. Each subframe includes multiple resource blocks (RB) in the frequency direction, and includes multiple symbols in the time direction. A guard interval called a cyclic prefix (CP) is provided at the beginning of each symbol.

In the downlink, an interval of the couple of symbols at the beginning of each subframe is mainly a control region used as a physical downlink control channel (PDCCH). The remaining interval of the subframe is a data region mainly used as a physical downlink shared channel (PDSCH).

In the uplink, the two ends of each subframe in the frequency direction are control regions mainly used as a physical uplink control channel (PUCCH). A center portion of the subframe in the frequency direction is a data region mainly used as a physical uplink shared channel (PUSCH).

(2) Outline of MBMS

MBMS is a bearer service for achieving broadcast distribution, and is a scheme in which MBMS data is Simultaneously distributed by a common bearer to multiple UEs desiring to receive the MBMS data.

In the LTE system, multiple eNBs form an MBSFN (MBMS Single Frequency Network), and MBMS data can be distributed by an MBSFN transmission scheme. The eNBs included in the MBSFN simultaneously and synchronously send the same signal. Accordingly, the UE can perform RF (Radio Frequency) synthesis for signals sent from the eNBs.

Figure 4:
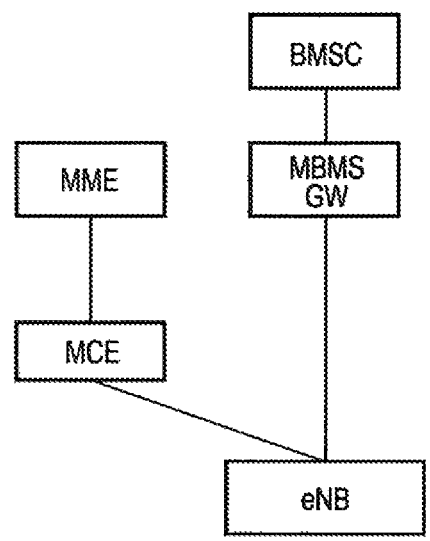
FIG. 4 shows a logical composition of an eMBMS base according to the embodiment of the present invention.

FIG. 4 shows a logical composition of an eMBMS base. As shown in FIG. 4, other than the network entities shown in FIG. 1, the LTE system includes a BMSC (Broadcast Multicast Service Center), an MBMS GW (MBMS Gateway), and an MCE (Multi-Cell Multicast Coordination Entity).

The BMSC holds MBMS data to be distributed. The MBMS GW transmits the MBMS data held by the BMSC to the eNBs by IP (Internet Protocol) multicast. For each of the eNBs in the MBSFN, the MCE synchronizes the MBMS data and assigns radio resource for the MBMS data.

Figure 5:
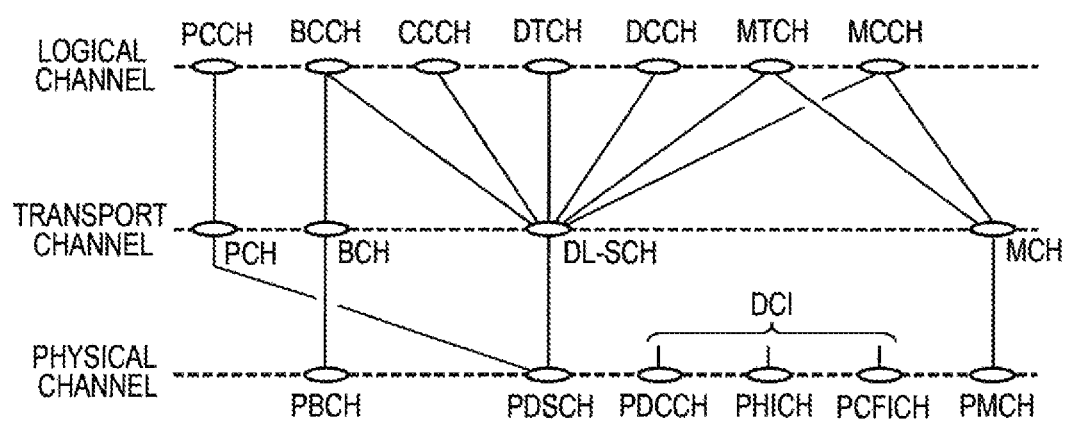
FIG. 5 shows mapping among logical channels, transport channels, and physical channels according to the embodiment of the present invention.

FIG. 5 shows mapping among logical channels, transport channels, and physical channels in the downlink. As shown in FIG. 5, the LTE system defines an MTCH (Multicast Traffic Channel) and an MCCH (Multicast Control Channel)

as logical channels for MBMS. Additionally, the LTE system defines an MCH (Multicast Channel) as a transport channel for MBMS.

The macrocell (specifically, the eNB managing the macrocell) sends MBMS data and MBMS service information for controlling MBMS data distribution through the multicast channel (the MTCH and the MCCH) by multicast.

On the other hand, the CSG cell (specifically, the HeNB managing the CSG cell) cannot use the MTCH or the MCCH. Note, however, that the CSG cell can distribute MBMS data to a UE establishing an RRC connection with the CSG cell, through a channel such as a DTCH (Dedicated Traffic Channel) and a DCCH (Dedicated Control Channel) by unicast.

It is to be noted that the macrocell and the CSG cell send broadcast information through a broadcast channel (BCCH; Broadcast Control Channel) by broadcast. Broadcast information is information such as an MIB (Master Information Block) and an SIB (System Information Block), for example.

(3) Configurations of eNB and UE

Figure 6:
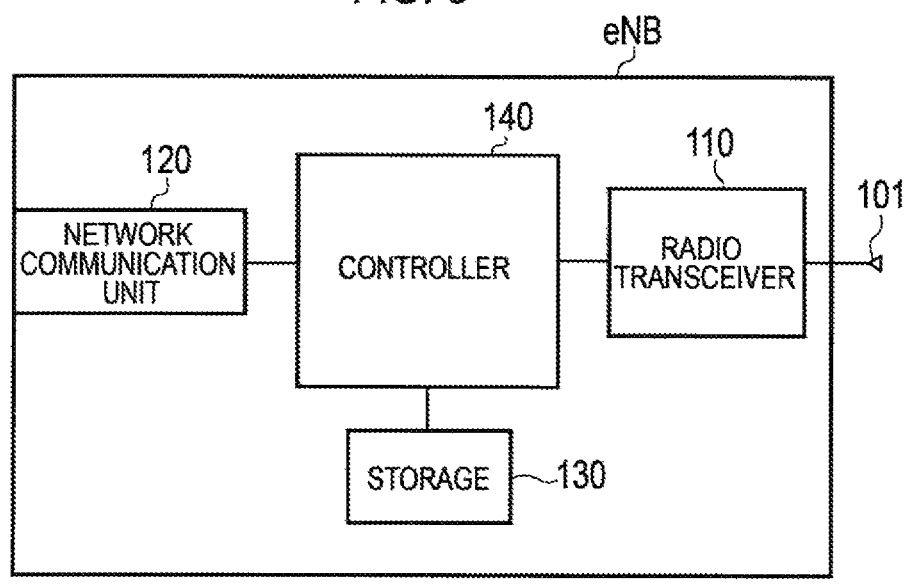
FIG. 6 is a block diagram of an eNB according to the embodiment of the present invention.

FIG. 6 is a block diagram of the eNB. Since the HeNB has the same block configuration as the eNB, the configuration of the eNB will be described below to represent the eNB and the HeNB.

As shown in FIG. 6, the eNB includes an antenna 101, a radio transceiver 110, a network communication unit 120, a storage 130, and a controller 140.

The antenna 101 and the radio transceiver 110 are used for transmission and reception of radio signals. The network communication unit 120 performs communication over the X2 interface and the S1 interface. The storage 130 stores therein information used for control by the controller 140. The controller 140 performs processing in the aforementioned layers, as well as performs various control to be described below.

Figure 7:
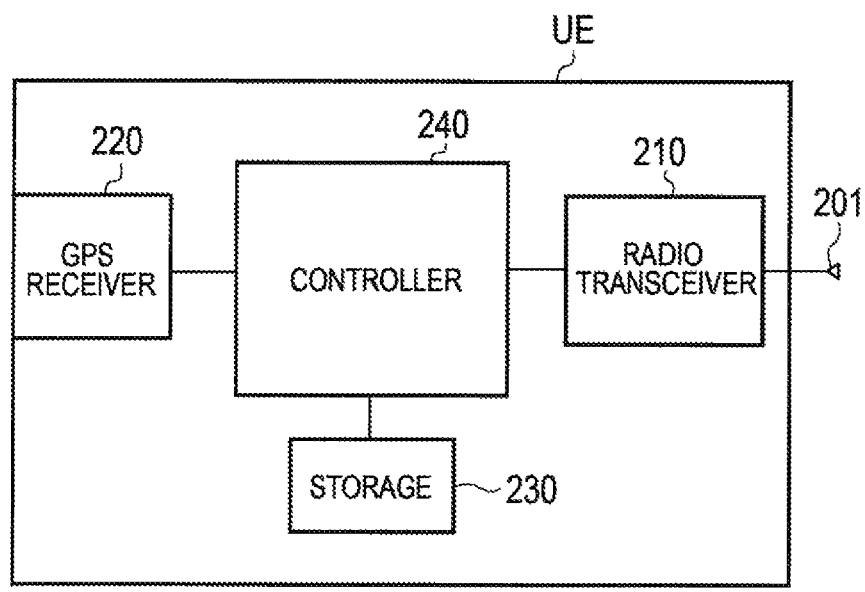
FIG. 7 is a block diagram of a UE according to the embodiment of the present invention.

FIG. 7 is a block diagram of the UE. As shown in FIG. 7, the UE includes an antenna 201, a radio transceiver 210, a GPS (Global Positioning System) receiver 220, a storage 230, and a controller 240.

The antenna 201 and the radio transceiver 210 are used for transmission and reception of radio signals. The GPS receiver 220 receives GPS signals to acquire UE location information indicating a location of the UE. The storage 230 stores therein information used for control by the controller 240. The controller 240 performs processing in the aforementioned layers, as well as performs various controls to be described below. The controller 240 also acquires UE location information based on an output of the GPS receiver 220. Note that in a case where the UE does not have the GPS receiver 220, the UE location information may be acquired on the basis of a radio signal received by the radio transceiver 210.

The storage 230 stores therein a white list which is a list of CSG cells to which the UE has access right (specifically, a list of CSG IDs). The storage 230 also stores therein CSG cell location information indicating the locations of the CSG cells to which the UE has access right. The CSG cell location information is used together with the UE location information in an autonomous search procedure, which is processing for determining whether or not a CSG cell to which the UE has access right exists near the UE.

(4) Operations of eNB and UE

Figure 8:
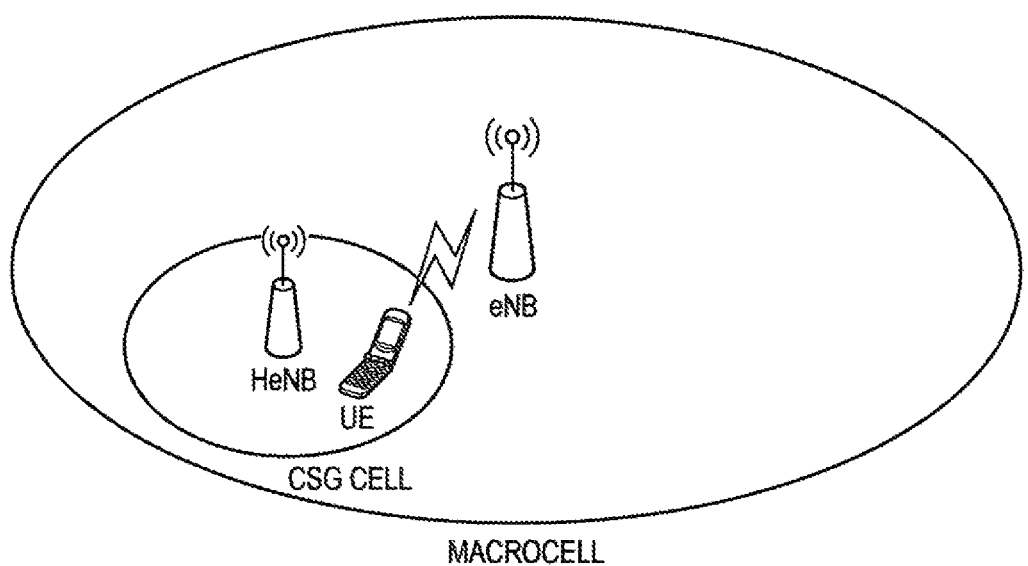
FIG. 8 shows an operation environment of the eNB and the UE according to the embodiment of the present invention.

FIG. 8 shows an operation environment of the eNB and the UE according to the embodiment.

As shown in FIG. 8, a CSG cell operated at a frequency different from that of the macrocell is provided inside the macrocell, and the UE in the RRC idle mode is located at a point where the macrocell overlaps the CSG cell. Here, the UE is a member UE of the CSG cell, and has access right to the CSG cell.

In such a case, the UE usually detects that it is near the CSG cell by the autonomous search procedure, for example, and selects the CSG cell as the serving cell. However, the UE desires to receive MBMS data, and thus selects the macrocell as the serving cell, to receive MBMS data distributed from the macrocell by PTM.

When uplink data to be sent by the UE exceeds a predetermined amount in this state, the UE usually establishes an RRC connection with the macrocell selected as the serving cell. However, in a case where the load level of the macrocell is high, for example, the quality of service received by the UE after establishment of the RRC connection with the macrocell is low.

Assume a case where, after establishment of the RRC connection with the macrocell to start communication therewith, the UE notifies the macrocell of proximity information (Proximity indication) indicating that the CSG cell to which the UE has access right exists near the UE based on a result of the autonomous search procedure. In this case, the macrocell can make the UE perform handover to the CSG cell.

The CSG cell to which only CSG members have access rights generally has a low load level than the macrocell to which not only the CSG members but also other UEs have access rights. For this reason, the UE can receive service of high quality after performing handover to the CSG cell.

Moreover, in the embodiment, in the process where the UE establishes the RRC connection with the macrocell, the macrocell finds that the CSG cell to which the UE has access right exists near the UE, and also finds the UE's potential uplink data amount. Hence, the macrocell can make the UE perform handover to the CSG cell immediately after establishment of the RRC connection.

Hereinafter, operations of the eNB and the UE according to the embodiment will be described. FIG. 9 is a sequence chart showing operations of the eNB and the UE in the operation environment shown in FIG. 8.

As shown in FIG. 9, in step S1, the UE in the RRC idle mode with the macrocell selected as the serving cell receives MBMS data distributed from the macrocell by PTM.

In step S2, the UE detects that uplink data to be sent is generated, and starts processing to establish an RRC connection with the macrocell selected as the serving cell.

In step S3, the UE sends a random access preamble through a physical random access channel (PRACH). Note that the macrocell broadcasts (SIB2, for example) information on radio resource (PRACH resource) usable for transmission of the random access preamble, and the UE uses the PRACH resource to send the random access preamble. Each cell can use multiple preamble sequences. The multiple preamble strings include a preamble set #1, a preamble set #2, and another preamble set. The UE uses the preamble set #1 for uplink data of a large amount, and uses the preamble set #2 for uplink data of a small amount. The other preamble set is a preamble set for contention-free access, and is assigned by a source cell at the time of handover, for example.

In step S4, upon receipt of the random access preamble from the UE, the macrocell (eNB) detects whether the preamble string of the random access preamble is the preamble set #1 or the preamble set #2 to judge (estimate)

the uplink data amount of the UE. Then, the macrocell (eNB) stores therein the judged uplink data amount.

In step S5, the macrocell (eNB) sends the UE a random access response, which is a response to the random access preamble, through a DL-SCH (see FIG. 5). The random access response includes timing correction information for synchronization of timings between the UE and the macrocell, information indicating the radio resource to be used for the next transmission of a message from the UE, and the like.

Steps S3 to S5 described above form a random access procedure.

In step S6, when establishing an RRC connection with the macrocell (eNB), the UE sends the macrocell (eNB) an RRC connection request message generated in the RRC layer.

In step S7, upon receipt of the RRC connection request message from the UE, the macrocell (eNB) sends the UE an RRC connection setup message for establishing the RRC connection. Here, the macrocell (eNB) sends the UE a Proximity information request together with the RRC connection setup message. The Proximity information request is information for requesting transmission of Proximity information indicating that there is an accessible CSG cell (i.e., a CSG cell to which the UE has access right) near the UE if there is. Note that the Proximity information request may be provided as an information element (IE) of the RRC connection setup message.

In step S8, upon receipt of the RRC connection setup message from the macrocell (eNB), the UE sends the macrocell (eNB) an RRC connection setup completion message indicating completion of establishment of the RRC connection. Here, when the UE receives the Proximity information request and determines by the autonomous search procedure that the CSG cell to which it has access right exists nearby, the UE sends the macrocell Proximity information together with the RRC connection setup completion message. Note that overhead can be reduced by providing the Proximity information as an IE of the RRC connection setup completion message, as compared to a case of sending the Proximity information alone.

Steps S6 to S8 described above form an RRC connection establishment procedure.

In step S9, upon receipt of the Proximity information from the UE, the macrocell (eNB) sends the UE an RRC connection Reconfiguration message including a CSG measurement configuration which instructs measurement of the CSG cell. Specifically, the CSG measurement configuration is information instructing measurement of the quality of the CSG cell reported by the Proximity information. The information includes a measurement gap for measuring the quality of the CSG cell.

In step S10, the UE sends the macrocell (eNB) an RRC connection Reconfiguration completion message, which is a positive response to the RRC connection Reconfiguration message.

The UE also measures the quality of the CSG cell in response to the CSG measurement configuration received from the macrocell (eNB) in step S9.

In step S11, the UE sends the macrocell (eNB) a measurement report for reporting the result of the measurement. The measurement report includes a PCI (Physical Cell Identifier) for identifying the CSG cell.

In step S12, the macrocell (eNB) sends the UE information (SI request) requesting acquisition of broadcast information (SI; System Information).

In step S13, the UE receives and acquires the broadcast information (SI) broadcasted from the CSG cell (HeNB). The broadcast information (SI) includes a CGI (Cell Global Identity), a TAI (Tracking Area Identity), a CSG ID, and the like.

In step S14, the UE sends the macrocell (eNB) a measurement report including the broadcast information (SI) acquired in step S13 and information (Member Indication) indicating whether or not the UE has access right to the specific cell (whether or not the UE is a CSG member).

In step S15, the macrocell (eNB) determines whether or not to make the UE perform handover to the CSG cell, based on the uplink data amount of the UE judged in step S4 and the measurement report received from the UE in step S14.

For example, when the macrocell (eNB) has a high load level, the UE has a large amount of uplink data to be sent, and the result of measurement of the CSG cell is favorable, the macrocell (eNB) determines to make the UE perform handover to the CSG cell, and otherwise, the macrocell (eNB) determines not to make the UE perform handover to the CSG cell.

The following processing is performed when the macrocell determines to make the UE perform handover to the CSG cell.

In step S16, the macrocell (eNB), the CSG cell (HeNB), and the UE perform the procedure for performing handover from the macrocell (eNB) to the CSG cell (HeNB). A concrete example of the handover procedure will be given later.

If the UE still desires to receive MBMS data after completion of the handover procedure, in step S14, the CSG cell (HeNB) distributes the MBMS data to the UE by PTP.

Next, a concrete example of the handover procedure (step S16) will be described. FIG. 10 is a sequence chart showing the concrete example of the handover procedure.

As shown in FIG. 10, after it is determined in step S15 to perform handover to the CSG cell, in step S161, the macrocell (eNB) sends the MME a handover request for requesting handover to the CSG cell (HeNB).

In step S162, the MME determines whether or not to allow the UE to access the CSG cell (HeNB). Here, the description is continued under the assumption that the UE has access right to the CSG cell (HeNB).

In steps S163 and S164, the MME sends the CSG cell (HeNB) via the HeNB GW a handover request for requesting handover to the CSG cell (HeNB).

In step S165, the CSG cell (HeNB) reserves radio resource for the UE 10.

In steps S166 and S167, the CSG cell (HeNB) sends the MME via the HeNB GW a positive response to the handover request received from the MME.

In steps S168 and S169, the MME sends the UE via the macrocell (eNB) a handover instruction instructing handover to the CSG cell (HeNB).

(5) Summary of Embodiment

As has been described, the communication control method according to the embodiment includes: step S6 of sending the macrocell the RRC connection request message, when the UE in the idle mode with the general cell selected as the serving cell requests establishment of the RRC connection with the macrocell; step S7 of sending the UE the RRC connection setup message for establishing the RRC connection from the macrocell, in response to the RRC connection request message received from the UE; and step S8 of sending the RRC connection setup completion message indicating completion of establishment of the RRC connection from the UE, in response to the RRC connection setup message received from the macrocell.

In step S6, the macrocell sends the UE the Proximity information request together with the RRC connection setup message. The Proximity information request is information for requesting transmission of Proximity information indicating that there is an accessible CSG cell near the UE if there is. In step S8, if there is an accessible CSG cell near the UE, the UE sends the macrocell the Proximity information together with the RRC connection setup completion message.

Thus, according to the embodiment, the eNB managing the macrocell can find whether or not an accessible CSG cell exists near the UE through the RRC connection establishment procedure. Accordingly, when the accessible CSG cell exists near the UE and the macrocell has a high load level, the UE can perform handover to the CSG cell immediately after establishing the RRC connection between the macrocell and the UE. Thus, it is possible to prevent the UE from receiving low-quality service.

The communication control method according to the embodiment further includes: step 9 of sending the UE the CSG measurement configuration instructing measurement of the CSG cell, when the macrocell receives the Proximity information from the UE; step 11 of sending the macrocell the measurement report for reporting the result of measurement from the UE, after the UE measures the CSG cell in response to the CSG measurement configuration received from the macrocell; and step S12 of determining whether or not to perform handover from the macrocell to the CSG cell by the eNB managing the macrocell, based on the measurement report received from the UE.

Hence, according to the embodiment, it is possible to measure the CSG cell and report the result immediately after completion of the RRC connection establishment procedure. As a result, preparation for handover to the CSG cell can be started earlier than the conventional method.

In the embodiment, the eNB managing the macrocell determines whether or not to perform handover from the macrocell to the CSG cell based not only on the measurement report from the UE but also on the uplink data amount of the UE estimated in the random access procedure.

For example, if there is not enough available radio resource for favorably sending the current amount of uplink data of the UE, the eNB managing the macrocell determines to perform handover from the macrocell to the CSG cell. Thus, it is possible to more surely prevent the UE from receiving low-quality service.

In the embodiment, the HeNB managing the CSG cell distributes MBMS data to the UE by PTP (unicast) after completion of the handover of the UE.

With this, the UE having received the MBMS data from the macrocell by PTM before the handover can still receive the MBMS data by PTP after completion of the handover. It is thus possible to ensure continuity of distribution of MBMS data to the UE.

Other Embodiments

It should not be understood that the description and drawings which constitute part of this disclosure limit the present invention. From this disclosure, various alternative embodiments, examples, and operation techniques will be easily found by those skilled in the art.

For example, although the embodiment above describes an example where the general cell is the macrocell and the specific cell is the CSG cell, the general cell may be a cell smaller than the macrocell, such as a picocell, and the specific cell may be a hybrid cell. A UE belonging to the CSG regards the hybrid cell as a CSG cell, and a UE not belonging to the CSG regards the hybrid cell as an open cell. Hence, a hybrid cell can be considered as a type of a CSG cell.

Moreover, although the embodiment above is explained by taking the LTE system as an example, the present invention is also applicable to other communication standards such as the UMTS (Universal Mobile Telecommunication System).

The entire content of US Provisional Application No. 61/591,479 (filed Jan. 27, 2012) is incorporated by reference.

INDUSTRIAL APPLICABILITY

As described above, the present invention is useful in a radio communication field such as a mobile communication.

The invention claimed is:

1. A communication control method employed in a mobile communication system including a general cell supporting PTM distribution of MBMS data and a CSG (Closed Subscriber Group) cell not supporting PTM distribution of the MBMS data, the method comprising:
 a step A of transmitting, by a user terminal in an idle mode with the general cell selected as a serving cell, a connection establishment request message to the general cell;
 a step B of transmitting, by the general cell, in response to reception of the connection establishment request, a connection establishment message for establishing the connection, to the user terminal; and
 a step C of transmitting, by the user terminal, in response to reception of the connection establishment message, an establishment completion message indicating completion of establishment of the connection, to the general cell, wherein
 in the step B, the general cell transmits a notification request message together with the connection establishment message to the user terminal,
 the notification request message is for requesting transmission of a proximity notification indicating that the CSG cell exists near the user terminal, and
 in the step C, the user terminal determines, based on an autonomous search procedure, whether the CSG cell exists near the user terminal,
 and
 transmits, in response to the user terminal determining that the CSG cell exists near the user terminal, the proximity notification together with the establishment completion message to the general cell, the method further comprising:
 a step D of transmitting, by the general cell, in response to reception of the proximity notification from the user terminal, a measurement instruction instructing measurement of the CSG cell, to the user terminal, wherein
 said autonomous search procedure further comprises:
 using CSG cell location information, which has been previously stored on the user terminal, together with location information of the user terminal, which has been acquired from GPS receiver or transceiver of the user terminal; and
 the CSG cell location information indicates locations of CSG cells to which the user terminal has access rights.

2. The communication control method according to claim 1, further comprising:
- a step E of transmitting, by the user terminal, a measurement report for reporting a result of the measurement to the general cell, after the user terminal measures the CSG cell according to the measurement instruction received from the general cell; and
- a step F of determining by a general base station managing the general cell, whether or not to make the user terminal perform handover from the general cell to the CSG cell, based on the measurement report received from the user terminal.

3. The communication control method according to claim 2, further comprising,
- before the step A, a step of performing, by the user terminal, a random access procedure for the general cell, wherein in the step F, the general base station determines whether or not to make the user terminal perform handover from the general cell to the CSG cell, based not only on the measurement report received from the user terminal, but also on an uplink data amount of the user terminal estimated in the random access procedure.

4. The communication control method according to claim 1, wherein the CSG cell is operated at a frequency different from a frequency of the general cell.

5. A user terminal employed in a mobile communication system including a general cell supporting PTM distribution of MBMS data and a CSG cell not supporting PTM distribution of the MBMS data, the user terminal comprising:
- a receiver that receives, from the general cell, a notification request message together with a connection establishment message for establishing a connection between the user terminal and the general cell, the notification request message is for requesting transmission of a proximity notification indicating that the CSG cell exists near the user terminal; and
- a transmitter that transmits, to the general cell, an establishment completion message indicating completion of establishment of the connection, in response to reception of the connection establishment message, wherein
- the user terminal further comprises a controller that determines, based on an autonomous search procedure, whether the CSG cell exists near the user terminal,
- the transmitter further transmits, to the general cell, in response to determining that the specific CSG cell exists near the user terminal, a proximity notification indicating that the CSG cell exists near the user terminal, together with the establishment completion message, and
- the receiver further receives a measurement instruction instructing measurement of the CSG cell in a response from the general cell for reception of the proximity notification,
- wherein said autonomous search procedure further comprises:
- using CSG cell location information, which has been previously stored on the user terminal, together with location information of the user terminal, which has been acquired from GPS receiver or transceiver of the user terminal; wherein
  - the CSG cell location information indicates locations of CSG cells to which the user terminal has access rights.

* * * * *